United States Patent Office 3,021,224
Patented Feb. 13, 1962

3,021,224
DEHYDRATED POTATO PRODUCT AND PROCESS
Arthur F. Stagmeier, New York, N.Y., assignor to General Foods Corporation, White Plains, N.Y., a corporation of Delaware
No Drawing. Filed Mar. 2, 1959, Ser. No. 796,236
5 Claims. (Cl. 99—207)

The present invention relates to a new and improved dehydrated potato process and product.

In the art of preparing a dehydrated potato product a number of desirable characteristics should be present. Foremost among these are ease of rehydration and good texture and flavor in the rehydrated product. Other features that are desired are storage stability without the necessity of very expensive packaging.

One of the present commercial processes for the production of dehydrated potato products is the "granule process" wherein raw whole potatoes of appropriate low sugar content are washed, peeled, sliced, steam cooked, mashed, and dried in the form of cooked potato granules. In the process a majority of the granules are recycled back into the stream of cooked mashed potatoes, this mixture being eventually passed to a dryer and the dried product being screened to remove imperfections. This process is characterized by a number of manufacturing advantages, e.g., the ability to remove imperfections without waste of peeled potato; the granule product also has fairly acceptable storage stability. However, as is recognized in the art, the product of the process suffers from the loss of some potato flavor by reason of the plurality of steps and the recycling and reheating of the potato material. It would be most desirable to provide a product which has the advantages of the so-called granule process and at the same time offers a desirable potato flavor as well as ease of recipe preparation.

A process of making a dehydrated potato product meeting the foregoing needs has now been discovered, which process essentially involves the combination of the aforesaid cooked potato granule with moisture to produce a "mash" or mixture containing approximately 70–85% moisture. This mixture is subsequently shaped in any suitable apparatus (such as a conventional potato ricer) into the form of elongated filaments wherein the granules are loosely agglomerated. These filaments are subsequently rapidly dried by means of circulating hot air or other suitable means to evaporate the moisture in such a manner that the filaments set in a substantially uncollapsed state to yield a porous rehydratable product characterized by its plurality of cavities and interstices and the substantially intact unruptured condition of its starch granules.

The "granule" used in the present process can be best described as comprising a cooked preswelled and dried potato powder which has not been gelatinized to the point where it has burst; a typical "granule process" is described in U.S. Patent No. 2,630,391 to Templeton, March 3, 1953. The mixture resulting from the blend of potato granules with the moisture is generally of a nature which permits it to be extruded in such a form that the filaments issuing from an extrusion opening will have the granules arranged so that moisture residing therewithin will readily escape upon evaporation. To achieve this desired condition a minimum of agitation is employed to avoid rupture of the starch granules prior to and during filament formation whereby pastiness is avoided in the final product; the hydrated swollen granules are loosely aggregated to one another in the manner of cooked mashed potatoes.

It is at this point of the process, viz., preparation of a mash from dried granules and prior to extrusion or shaping, that various additives may be employed to endow the eventual product with protein supplements or flavors. Included among these additives are such materials as soy flour, peanut flour; proteinaceous extracts in a more purified state from nutmeats like soybean and peanut; vegetable materials in a dehydrated powderous or liquid condition such as tomato paste, onion juices and the like; skim milk solids; de-oiled fish; and emulsified plastic fats and powdered fats produced by drying emulsified fats with proteinaceous encapsulating solids. In addition to or in lieu of these additives other flavoring materials heretofore discarded as potato waste may be added to the mash to fortify the potato mash with desirable proteins and most important a desirable potato flavor; preferred of the sources of this potato flavor are the water soluble solids of the discarded peel fraction recovered either as a result of steam treatment or a hand or mechanical peeling of potatoes; flavoring materials can be recovered as a supernatant from an aqueous slurry of such materials in which form they are relatively free of rot and other undesirable material.

While the present invention contemplates the preferred addition of such flavoring materials and particularly the potato flavoring compositions referred to herein, it is not to be so restricted inasmuch as it has been found that novel potato flavors are noted in the reconstituted product prepared from a dehydrated shred or filament; the reason for this improved flavor appears to be the unique heat treatment which the discrete potato granules undergo while they are in the hydrated filament or shred in a loosely aggregated condition.

The rehydrated potato mash is preferably tempered prior to shaping into filaments by holding for a few hours to effect a uniform distribution of moisture throughout and is thereafter introduced to a shredding chamber having orifices or openings of a size ranging from $\frac{1}{16}$ to $\frac{3}{8}$ of an inch, the size of such openings being determined by the end use or form of the dehydrated product. Preferably the product is extruded by means of a conventional ricing apparatus, which apparatus consists of a perforated drum with a suitable internal rolling mechanism to force the potato mash through the orifices in the drum. The shreds or filaments produced can be deposited separately of one another or may be interlaced in any desired form depending again on the desired end use. At this point it should be noted that the shreds or filaments should not be collected in such a fashion that would impede the free circulation of heated air or the ready access of heat so that rapid dehydration of the shreds or the filaments can be obtained. In this connection, therefore, it is preferred that the filaments be arranged in a relatively shallow bed not higher in thickness than one-half inch, which bed is supported on a suitable foraminous belt or screen whereby heated air may be circulated through the bed in such a fashion that the filaments will be dried rapidly and set in a low density, uncollapsed porous state. Rapid filament dehydration is critical to the present process; otherwise undue starch granule rupture will result thereby producing a product which is pasty upon rehydration and, furthermore, is not as rehydratable as desired. In practicing the present invention a continuous dryer having a series of stages of controllable temperatures wherethrough a wire mesh conveyor belt travels is preferably employed. With such a continuous dryer a circulating body or bodies of hot air are practiced having air temperatures ranging anywhere from 125°–280° F., the air being circulated through a bed of shreds an inch or less in thickness at a superficial air velocity of 500–700 f.p.m. in the early stages of drying at temperatures of 240°–280° F.; in the later stages of drying when the product moisture content is below 20%, a lower air temperature of 125°–135° F. is employed until a superficially dry shred of 3–10% moisture is achieved.

The product so prepared is characterized by a highly acceptable potato flavor which can be further endowed by the manner aforesaid, i.e., incorporation of potato flavor components derived from a slurry of the peel fraction of potato. The product is characterized by its highly porous, readily rehydratable and stable character. The product has a vesicular texture substantially free of liberated starch when reconstituted, and is relatively free of lumps which ordinarily result from uneven rehydration. The product of the present invention can be rehydrated in hot tap water or boiling water.

While the present invention has been described with particular reference to specific examples, it is not to be limited thereby, but reference is to be had to the appended claims for a definition of its scope.

What is claimed is:

1. A process for producing a readily reconstitutable dehydrated mashed potato product which comprises combining preswelled dried potato granules with approximately 70–85% by weight of moisture to produce a potato mash, extruding said potato mash into filaments wherein the hydrated granules are loosely agglomerated, and rapidly drying said filaments to set them in a substantially uncollapsed state to yield a porous, rehydratable product characterized by its plurality of cavities and interstices and the intact unruptured condition of its starch granules.

2. The process of claim 1 wherein an additive is added to the mash prior to extrusion.

3. The process of claim 1 wherein the water-soluble constituents of raw potato peel are incorporated into the potato mash.

4. The process of claim 1 wherein the shreds are rapidly dried by means of circulating hot air.

5. The product of the process of claim 1.

References Cited in the file of this patent
UNITED STATES PATENTS

| | | |
|---|---|---|
| 1,402,108 | Stoddard et al. | Jan. 3, 1922 |
| 2,469,995 | Schaul | May 10, 1949 |
| 2,481,122 | Kaufman et al. | Sept. 6, 1949 |
| 2,520,891 | Rivoche | Aug. 29, 1950 |
| 2,630,391 | Templeton | Mar. 3, 1953 |
| 2,863,770 | Speiser | Dec. 9, 1958 |